# United States Patent Office 2,872,380
Patented Feb. 3, 1959

2,872,380

PROCESS FOR THE PRODUCTION OF 17-β HYDROXYSTEROIDS BY NEOCOSMOSPORA

Gilbert M. Shull, Huntington Station, N. Y., and John B. Routien, Tenafly, N. J., assignors to Chas. Pfizer & Co., Inc., New York, N. Y., a corporation of Delaware No Drawing. Application February 15, 1957
Serial No. 640,318

11 Claims. (Cl. 195—51)

This invention is concerned with a novel process for the oxidative degradation of the 17-side chain of 3-ketosteroids, especially 3-keto-20-oxygenated steroids, to yield 3-keto-17β-hydroxysteroids. The process of the present invention comprises subjecting a 3-ketosteroid having a two carbon atom aliphatic side chain at the 17-position such as a pregnane-3,20-dione, to the oxidative activity of an organism of the genus Neocosmospora to produce a 3-keto-17β-hydroxysteroid, such as a 3-keto-17β-hydroxyetiocholane. In particular, it relates to the conversion of $\Delta^4$-pregnene-3,20-dione compounds, such as progesterone and desoxycorticosterone, to 3-keto-17β-hydroxy-$\Delta^4$-androstenes, such as testosterone, by the use of a $C_{17}$-side chain oxidizing strain of the genus Neocosmospora.

It is an object of the present invention to provide a direct method for the degradation of a two carbon atom aliphatic side chain at the 17-position of a 3-ketosteroid, especially a 3,20-diketosteroid, by the oxidative activity of a microorganism of the genus Neocosmospora wherein the latter is cultivated aerobically in a nutrient medium containing the said steroid. It is of especial interest to provide a process for the production of 3-keto-17β-hydroxyandrostane and 3-keto-17β-hydroxyetiocholane compounds as well as 3-keto-17β-hydroxy-$\Delta^4$-androstenes, which are of value in the treatment of androgen deficiencies, uterine disorders and in mammary cancers.

The degradation of the 17-side chain of steroid compounds by chemical means to give 17-ketosteroids is well known. It should be noted that these procedures usually involve a number of steps such as formation of a 17(20) double bond and subsequent oxidation of this double bond. The steroid nucleus is often attacked in other positions during such oxidative degradations; in particular, double bonds are susceptible to attack, resulting in low yields due to the occurrence of these undesirable side reactions. In order to avoid such losses, these positions and groups must be protected and this involves two additional steps as practiced in the prior art. For instance, in the Journal of Organic Chemistry, volume 13, page 10 (1948), there is described by Bergmann and Stevens a method for the ozonolysis of the 22-enol acetate of 3β-acetoxy-bisnor-5,7-chlodaien-22-al protected by a 5,8-maleic anhydride adduct group, to yield the maleic anhydride adduct of 3β-acetoxy-5,7-androstadiene-17-one. It is within the scope of the present invention to provide a direct method for the production of a 17β-hydroxysteroid by means of fermentative degradation of the side chain of a 20-oxygenated steroid. A variety of useful products are furnished by use of this invention. For example, when either progesterone or desoxycorticosterone is subjected to the oxidative activity of a microorganism of the genus Neocosmospora (the latter is cultivated aerobically in a nutrient medium), there is obtained in one direct step a good yield of testosterone, a valuable therapeutic agent. Hence, the process of this invention offers a new and useful route to therapeutically important compounds which were heretofore unavailable by a direct one-step method. Similarly, other physiologically and pharmacologically active 3-keto-17β-hydroxysteroids may be obtained by subjecting steroid starting materials to the oxidative process of this invention.

The starting steroid materials of the present invention are the 3-ketosteroids having an aliphatic side chain at the 17-position, preferably the 3,20-diketosteroids and 3-keto-20-hydroxysteroids. The cyclopentanopolyhydrophenanthrene radical with a 17-side chain may possess keto groups or hydroxy groups in several positions, especially positions 3, 11, 14, 20 and 21, and may have double bonds in various positions, especially in positions 4 and 5. However, there can be no oxygen atom or hydroxy group at the C–17 position, but only a carbon side chain. The process of this invention is preferably conducted with ketosteroids containing a short side-chain e. g., a chain containing from one to three carbon atoms. Furthermore, the preferred starting steroid materials should contain at least a 3-keto group in addition to the $C_{17}$-aliphatic side chain, and for optimum results a total number of 21 or 22 carbon atoms should be present in the carbon skeleton of the steroid molecule. Examples of such compounds include progesterone, 14α-hydroxyprogesterone, 11-ketoprogesterone, pregnane-3,20-dione, desoxycorticosterone and hydrocarbon carboxylic acid esters thereof.

The process of this invention is carried out by subjecting the desired 3-ketosteroid having a two carbon atom side chain at the 17-position, dissolved in a suitable solvent, to the oxidative activity of a species of the genus Neocosmospora; the microorganism is cultivated aerobically in a nutrient medium containing the 3-ketosteroid. The genus Neocosmospora belongs to the family Hypocreaceae of the order Hypocreales of the class Ascomyceteae. Of particular value for the method presented herein are strains of the species *Neocosmospora vasinfecta* E. F. Smith. These organisms are available in public culture collections and others may be isolated from the natural materials, such as soil, by standard procedures well known to mycologists. It is to be understood that the present invention includes variants of any new strain of this species as well as any mutants produced from the described organism by various means, such as X-radiation, ultra-violet radiation, nitrogen mustards and the like. Furthermore, there is included within the scope of this invention any mutants or forms of *N. vasinfecta* that are developed by such techniques as described by L. S. Olive in the American Journal of Botany, vol. 43, issue 2, pages 97–106 (1956) and G. Pontecorvo in Advances in Genetics, vol. 5, pages 141–238 (1953); also included are other $C_{17}$-side chain oxidizing Neocosmospora organisms not presently identified as to species. We also wish to include the imperfect form of *N. vasinfecta*, i. e. *Fusarium vasinfectum* Atk. and *F. niveum* E. F. Smith (according to Fred Jay Seaver in North American Flora, vol. 3, part 1: 18 (1910)).

Cultures of microorganisms for the practice of the present invention are grown in or on a medium favorable to their development. Solid media may be utilized, but liquid media are preferred as they favor mycelial growth under aerobic conditions. Liquid media, such as brewer's wort, are well adapted to use under aerobic submerged fermentation conditions. The media should contain suitable sources of available carbon, nitrogen and minerals in order that substantial growth be achieved under optimum conditions.

Available carbon may be obtained from proteins, amino acids, carbohydrates, starches, dextrin, molasses and sugars, such as glucose, fructose, mannose, galactose, maltose, sucrose, lactose, various pentoses, and cerelose. Carbon dioxide, glycerol, alcohols, acetic acid, sodium acetate, etc., are illustrative of other materials which provide assimilable carbon for the energy requirements of the microorganisms. Mixtures of various carbon sources are sometimes advantageous.

Nitrogen may be provided in assimilable form from such suitable sources as soluble or insoluble animal and vegetable proteins, soybean meal, lactalbumin, casein, egg albumin, peptones, polypeptides or amino acids, urea, ammonium salts, sodium nitrate or potassium nitrate; whey, distillers' solubles, corn steep liquor, and yeast extract have also been useful.

Among the mineral constituents which the media may contain, either naturally present or added, are available calcium, chromium, cobalt, copper, iron, magnesium and potassium. Sulfur may be provided by means of sulfates, free sulfur, hyposulfite, persulfate, thiosulfate, methionine, cystein, cystine, thiamin and biotin. Phosphorus can be provided from such sources as ortho-, meta-, or pyrophosphates, salts or esters thereof, glycerophosphate, corn steep liquor and casein.

Suspending or mycelial carriers such as filter earths, filter aids, finely divided cellulose, woodchips, bentonite, calcium carbonate, magnesium carbonate, charcoal, activated carbon or other suspendable solid matter, methyl cellulose, carboxymethyl cellulose or alginates may be added to facilitate fermentation, aeration and filtration.

The strain of the species Neocosmospora vasinfecta with which we are particularly concerned is grown on a medium containing assimilable non-steroidal carbon such as carbohydrates, assimilable nitrogen such as alkali nitrates, and mineral constituents such as phosphates and sulphates. The medium may possess before inoculation a pH in the range of about 5–8, although a higher or lower pH may be used. A pH in the range of about 6–7 is preferred for the growth of *N. vasinfecta*.

Inoculation of the growth-supporting medium with selected strains of the species *N. vasinfecta* may be accomplished in any suitable manner. The microorganisms may be grown over a temperature range of from about 20–38° C., with a temperature in the range between 25–35° C. being preferred. It has been found that optimum conditions are usually obtained at about 28° C. The temperature during the period of fermentation of the steroid may be the same as that found suitable for the mycelial growth. It must be maintained only in the range that is necessary for the support of life, the active growth, or the enzyme activity of the organism.

The period of growth and development for the microorganism before the steroid can be exposed to its oxygenating activity does not appear to be critical. For example, it may be added initially or anytime from 24–48 hours after inoculation of the medium with the selected strain of the species *N. vasinfecta*. The steroid whose side-chain is to be degraded can be added in any suitable concentration so that the substrate is present in the fermentation mixture in the range of from about 0.1 to 2.0 g. per liter. However, it is preferable to add a dilute solution (about 5% in acetone) of the starting steroid so that the substrate is present in the fermentation mixture at a concentration in the range of from about 0.4–0.6 g. per liter of medium. The process may even be operated at concentrations of steroid substrate of up to 2 g. per liter, depending upon the particular steroid used, although there may be some inhibition of mycelial development. The addition of the steroid substrate may be accomplished in any suitable manner that will offer a large surface of contact of the substrate with the microorganism; for example, it can be dispersed, either alone, with a dispersing agent, or in solution with an organic solvent. Submerged or surface culture procedures may be used with equal facility, although the submerged culture is preferred. Furthermore, it may be found desirable to employ steroid oxidizing enzymes of a growth of the strain with which we are concerned by separating them from the mycelial cells or medium; these fermenting enzymes may then be mixed with a steroid or a solution or dispersion thereof, and the resulting mixture subjected to aerobic conditions to accomplish degradation of the 17-side chain of the steroid.

It is to be noted that the efficiency of steroid oxidative degradation is related to aeration. The latter is usually conducted by means of agitation and/or blowing air through the fermentation medium. It may be effected by surface culture or under submerged fermentation conditions. Air may be used as a source of oxygen, as well as mixtures containing oxygen in liberated form. When air is employed as the aerating medium, a desirable rate of aeration is in the range of about one-half to two volumes of air per volume of fermentation medium per minute. In addition, such modifications as superatmospheric or subatmospheric pressures, such as 30 lbs./sq. inch or 10 lbs./sq. inch absolute, may also be employed.

The time required for the oxidative degradation of the steroid sidechain varies somewhat with the procedure. When the steroid substrate is present at the time of inoculation of the medium, periods of from about one day to a week may be used. However, when the steroid is added to the whole broth after substantial aerobic growth of the organism has been achieved (for example, after 24–72 hours at optimum temperature), the conversion of the steroid substrate commences immediately and excellent conversions are obtainable after periods of from one to five days, although 24 hours is generally satisfactory; in practice, the reaction is usually conducted for at least four days in order to ensure completeness.

After completion of the oxidative degradation, the desired 3-keto-17β-hydroxysteroid is recovered from the fermentation reaction mixture. A particularly advantageous method for recovering the product involves extraction of the fermentation reaction mixture with a water-immiscible organic solvent, such as methylene chloride, chloroform, carbon tetrachloride, ethylene chloride, ether, amyl acetate, benzene and the like. The combined extracts can then be washed with a dilute alkaline solution such as sodium bicarbonate and suitably dried over anhydrous sodium sulfate. Upon evaporation of the solvent in vacuo, the desired 3-keto-17β-hydroxy steroid crystallizes out and can be purified by means of chromatography wherein the 3-keto-17β-hydroxy steroid is isolated from the other fermentation products. Further purification is achieved by recrystallization from other organic solvents.

The invention is further illustrated by the following examples, which are not to be considered as imposing any limitation thereon.

*Example I*

A culture of an organism from the culture collection of Chas. Pfizer & Co., Inc., of Brooklyn, New York and designated as a strain of *Neocosmospora vasinfecta* (isolate under our Code No. 961–43G) was propagated on a potato dextrose agar medium at 28° C. A living culture of this organism has been deposited with the American Type Culture Collection in Washington, D. C., where it has been given the accession number ATCC 12717. The organism was rinsed from the agar slant under aseptic conditions into seven Fernbach flasks each of which contained 1000 ml. of a sterile medium having the following composition:

| | Grams |
|---|---|
| Malt extract | 5.0 |
| Cerelose (dextrose hydrate) | 30.0 |
| Sodium nitrate | 2.0 |
| Potassium dihydrogen phosphate | 1.0 |
| Potassium chloride | 0.5 |
| Magnesium sulfate heptahydrate | 0.5 |
| Ferrous sulfate heptahydrate | 0.01 |
| Water (up to 1000 ml.), adjusted to pH 6.7 with potassium hydroxide. | |

After constant agitation (via shaking) of the above whole broth at 28° C. for 72 hours, 500 mg. of desoxycorticosterone dissolved in 10 ml. of acetone was added under sterile conditions (the acetone solution was sterilized by filtration through a sintered glass filter). The mixture was then agitated at about 28° C. for an additional four days. The contents of the flask were then combined and extracted with several portions of chloroform using one-fifth the volume of the aqueous phase each time. The combined extracts were dried over anhydrous sodium sulfate and, after the drying agent was filtered off, the solvent was evaporated in vacuo until approximately one-twentieth of its volume remained. This solution was then chromatographed on a silica gel column which had been previously treated with a small volume of ethanol. The column was then developed by means of a mixture of chloroform and ethanol (100:3 by volume). The effluent from the column was then collected in small fractions of equal volume and examined by means of paper chromatography in order to separate all the fractions containing the desired product. All of the fractions containing the desired product were combined and upon concentration of the solution there was obtained 300 mg. of a crystalline material, M. P. 153.5–155.5°; $[\alpha]_D^{25°}$ +108.0° (C, 1; CHCl₃);

$\lambda_{max}^{H_2SO_4}$ at 300 and 450 m$\mu$

This compound was identical with testosterone; this was further indicated by the fact that it exhibited no melting point depression on admixure with an authentic sample.

*Example II*

The same procedure was followed as in Example I except that 500 mg. of progesterone was the steroid added. The crystalline product isolated was found to be identical with testosterone.

*Example III*

A strain of *N. vasinfecta* was rinsed from the agar slant under aseptic conditions into a sterile medium having the following composition:

| | Grams |
|---|---|
| Soybean meal | 33.0 |
| Potassium dihydrogen phosphate | 1.43 |
| Water in sufficient amount to bring the total volume of solution to 1000 ml. | |

After growth under aerated fermentation conditions at about 28° C. for 48 hours, 100 ml. of this broth was transferred to a fermentator containing 2000 ml. of the same medium and 1 g. of progesterone (autoclaved with the medium). After 18 hours of aerated fermentation with constant agitation, the fermentation reaction mixture was extracted with chloroform and the resulting extracts subjected to chromatographic assay as described in Example I. It was found that 69% of the progesterone added had been converted to testosterone with only a trace of progesterone remaining.

*Example IV*

The same procedure as in Example I was followed, except that desoxycorticosterone acetate was the starting steroid employed. It was found that the crystalline product was testosterone. Similarly, other esters of desoxycorticosterone, such as the formate, propionate and butyrate, yield testosterone.

*Example V*

Using the same procedure as described in Example I except that 11-ketoprogesterone was used as the starting material, it was found that 17β-hydroxy-Δ⁴-androstene-3,11-dione was the product obtained.

*Example VI*

When 14α-hydroxyprogesterone was employed as the starting material according to the procedure of Example I, 14α-hydroxytestosterone was produced.

*Example VII*

When pregnane-3,20-dione was the steroid starting material employed according to the procedure of Example I, 3-keto-17β-hydroxyetiocholane was obtained.

What is claimed is:

1. A process for the degradation of the 17-side chain of a 3-keto steroid to yield a 3-keto-17β-hydroxysteroid, which comprises subjecting a 3-ketosteroid having a two carbon atom aliphatic side chain at the 17-position to the oxidative activity of an organism chosen from the genus Neocosmospora.

2. A process for the degradation of the 17-side chain of a 3-keto steroid to yield a 3-keto-17β-hydroxysteroid, which comprises cultivating aerobically a microorganism of the genus Neocosmospora in a nutrient medium containing a 3-ketosteroid having a two carbon atom aliphatic side chain at the 17-position.

3. A process as claimed in claim 2 wherein the microorganism is a strain of the species *Neocosmospora vasinfecta*.

4. A process as claimed in claim 2 wherein the nutrient medium contains a 3-keto-Δ⁴ steroid having a two carbon atom aliphatic side chain at the 17-position.

5. A process for the production of a 3-keto-17β-hydroxy-Δ⁴androstene compound, which comprises cultivating aerobically a microorganism of the genus Neocosmospora in a nutrient medium containing a 3-keto-20-oxygenated-Δ⁴-pregnene.

6. A process for the production of a 3-keto-17β-hydroxy-Δ⁴androstene compound, which comprises cultivating aerobically a microorganism of the species *Neocosmospora vasinfecta* in a nutrient medium containing a 3,20-diketo-Δ⁴-steroid having a two carbon atom aliphatic side chain at the 17-position.

7. A process as claimed in claim 6 wherein the 3,20-diketo-Δ⁴-steroid is chosen from the group consisting of progesterone, 14α-hydroxyprogesterone, 11-ketoprogesterone, desoxycorticosterone and hydrocarbon carboxylic acid esters of desoxycorticosterone.

8. A process for the production of testosterone, which comprises cultivating aerobically a microorganism of the species *N. vasinfecta* in a nutrient medium containing a 3,20-diketo-Δ⁴-steroid chosen from the group consisting of progesterone, desoxycorticosterone and hydrocarbon carboxylic acid esters of desoxycorticosterone.

9. A process for the production of a 3-keto-17β-hydroxyandrostane, which comprises cultivating aerobically a microorganism of the genus Neocosmospora in a nutrient medium containing a 3,20-diketoallopregnane.

10. A process for the production of a 3-keto-17β-hydroxyetiocholane, which comprises cultivating aerobically a microorganism of the genus Neocosmospora in a nutrient medium containing a 3,20-diketopregnane.

11. A process for the production of a 3-keto-17β-hydroxyetiocholane, which comprises cultivating aerobically a microorganism of the species *N. vasinfecta* in a nutrient medium containing a pregnane-3,20-dione.

References Cited in the file of this patent

Vischer and Wettstein: Eperientia IX, 10 (1953), pp. 371–372.